United States Patent
Audic et al.

(10) Patent No.: US 6,312,600 B1
(45) Date of Patent: Nov. 6, 2001

(54) METHOD FOR AUTOMATICALLY ADJUSTING THE AERATION OF AN INSTALLATION FOR BIOLOGICAL TREATMENT OF WASTE WATER

(75) Inventors: Jean-Marc Audic, Conflans Sainte Honorine; Philippe Caulet, Bailly; Fanny Lefevre, Poissy, all of (FR)

(73) Assignee: Suez-Dvonnaiese des Eaux, Nanterre (FR)

( * ) Notice: Subject to any disclaimer, the term of this patent is extended or adjusted under 35 U.S.C. 154(b) by 0 days.

(21) Appl. No.: 09/582,821
(22) PCT Filed: Jul. 15, 1998
(86) PCT No.: PCT/FR98/01252
§ 371 Date: Jul. 3, 2000
§ 102(e) Date: Jul. 3, 2000
(87) PCT Pub. No.: WO99/01384
PCT Pub. Date: Jan. 14, 1999

(30) Foreign Application Priority Data

Jun. 30, 1997 (FR) .................................. 97 08212

(51) Int. Cl.$^7$ ................. C02F 3/00; C02F 3/12
(52) U.S. Cl. ............. 210/614; 210/620; 210/746; 210/903; 210/908
(58) Field of Search ................... 210/614, 620, 210/629, 746, 739, 903, 908, 96.1

(56) References Cited

U.S. PATENT DOCUMENTS

| | | |
|---|---|---|
| 4,425,231 * | 1/1984 | Fujimoto et al. . |
| 5,304,308 * | 4/1994 | Tsumura et al. . |
| 5,624,565 * | 4/1997 | Lefevre et al. . |
| 6,024,875 * | 2/2000 | Sevic . |
| 6,093,322 * | 7/2000 | Bongards . |

FOREIGN PATENT DOCUMENTS 0 703 194 * 3/1996 (EP) .

* cited by examiner

*Primary Examiner*—David A. Simmons
*Assistant Examiner*—Fred Prince
(74) *Attorney, Agent, or Firm*—Connolly Bove Lodge & Hutz

(57) ABSTRACT

The oxidoreduction potential is measured on each of a number of tanks. A data processing system analyzes the oxidoreduction potential evolution and establishes a diagnosis of the aeration/biology couple to ensure the degradation reactions of the carbonaceous and nitrogenous pollution. It is then determined whether to start, to continue, or to stop aeration in the tanks, depending on the required degree of purification. In the first tanks, priority is given to the treatment of carbonaceous pollution with specific parameter representation of the oxidoreduction potential threshold values. In the last tank, fine-tuning the treatment of the carbonaceous and nitrogenous pollution is accomplished by managing the aeration.

4 Claims, 4 Drawing Sheets

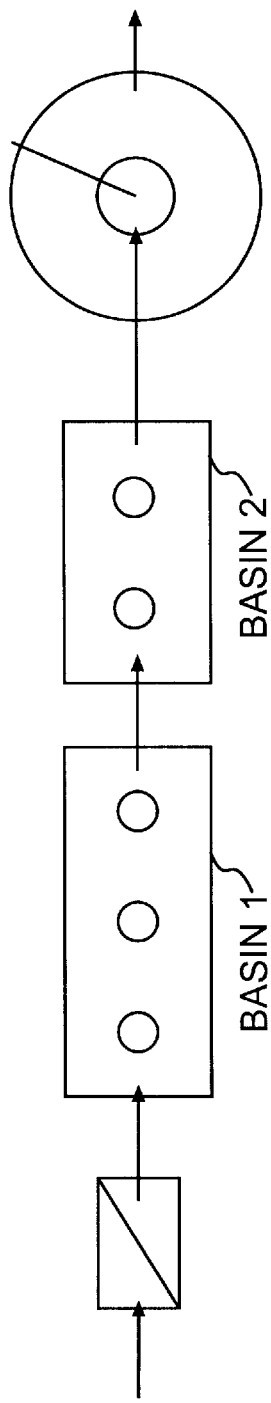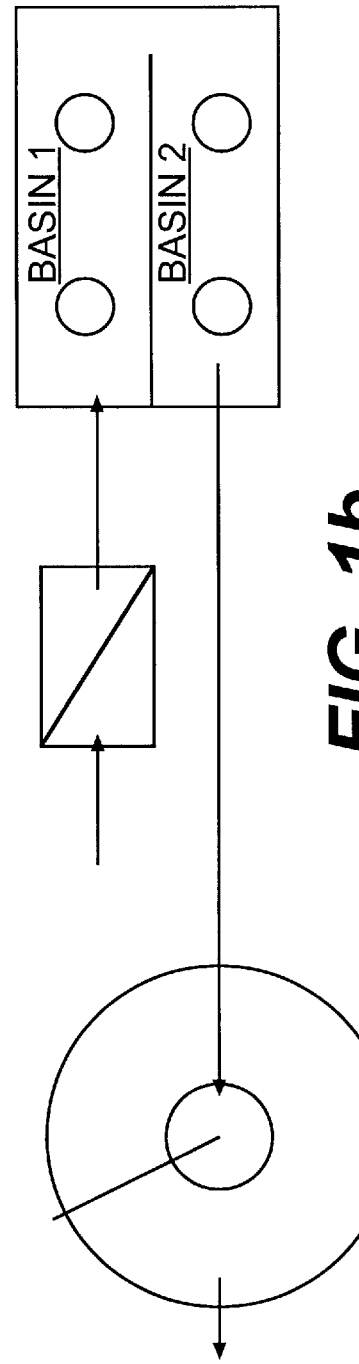
FIG. 1a *PRIOR ART*
FIG. 1b *PRIOR ART*

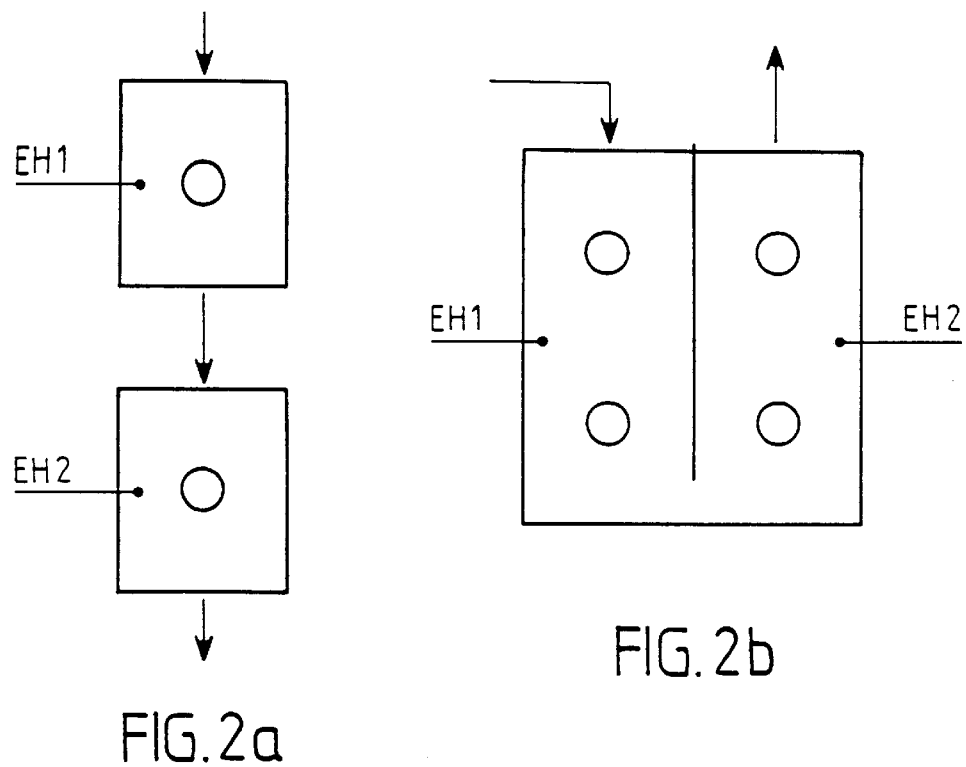
FIG.2a
FIG.2b
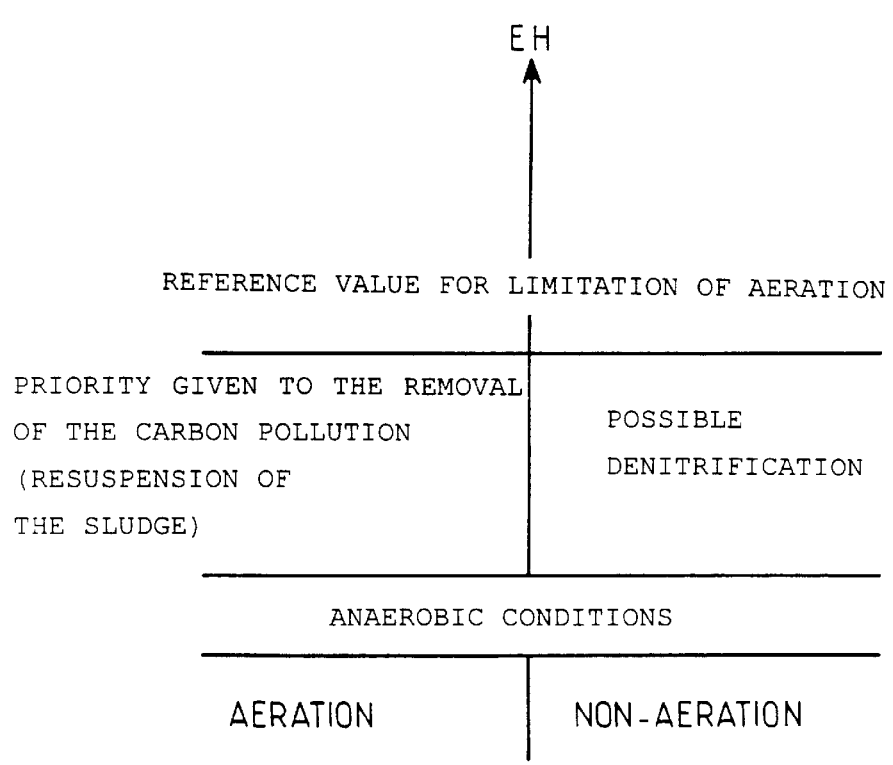
FIG.3a "UPSTREAM" CELLS

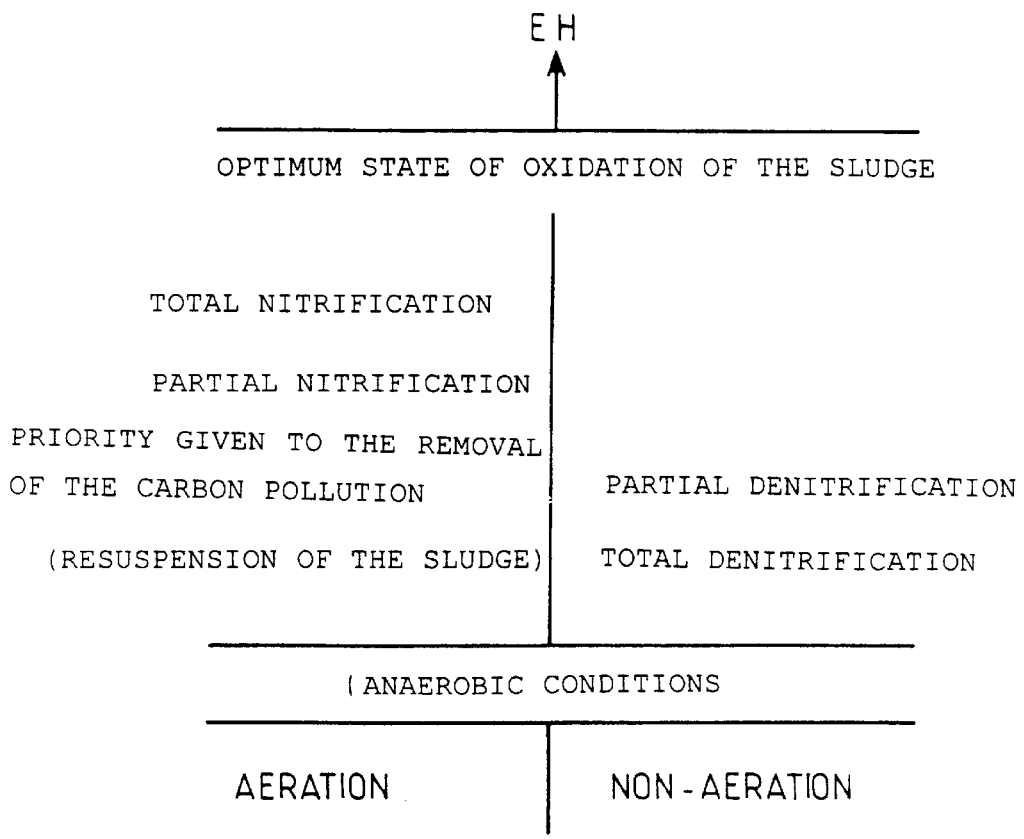
FIG. 3b   "DOWNSTREAM" CELLS
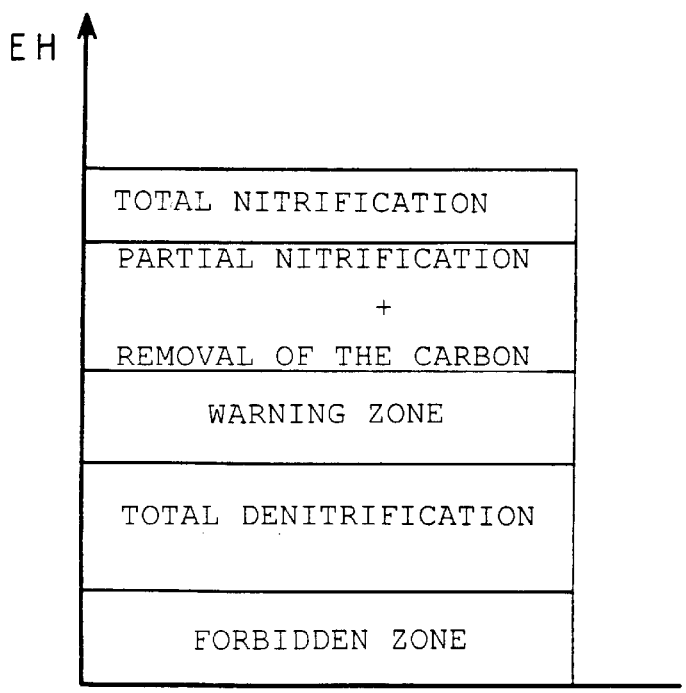
FIG. 4

METHOD FOR AUTOMATICALLY ADJUSTING THE AERATION OF AN INSTALLATION FOR BIOLOGICAL TREATMENT OF WASTE WATER

FIELD OF THE INVENTION

The invention relates to a process for e automatic regulation of the aeration of a biologic MAC wastewater treatment plant for the removal of carbon and nitrogen pollution.

BACKGROUND OF THE INVENTION

It is known that the purification of wastewater constitutes a major problem. Accordingly, the European Union has been led to issue a directive (No. 91/271/EEC) relating to the treatment of urban wastewater which determines the limits of discharges, into the natural environment, of untreated wastewater. Thus, each treatment unit is attributed a precise objective as regards the quality of the water treatment, it being possible for failure to achieve such an objective to give rise to penalties of a financial or even a penal nature.

The majority of urban wastewater treatment plants use the activated sludge process. An important phase of this process consists in the removal of the carbon and the nitrogen contained in the wastewater, by sequencing of the periods of aeration. It is indeed known that the main problem encountered in wastewater treatment plants is adapting the treatment to the variations in the rate of entry of the water to be purified and to its polluting load, so as to obtain a constant quality of purified water and the minimum regulatory quantity of polluting discharges into the natural environment. For this purpose, the removal of carbon and nitrogen requires a very strict and precise control of aeration given that this removal must correspond to two requirements. According to the first, a sufficient total duration of aeration should be provided per day in order to carry out the oxidation of the carbon components of the wastewater and the stabilization of the sludge; the second is linked more directly to the daily distribution of the aeration phases in order to successfully carry out the removal of the nitrogen. On the one hand, it is necessary to observe a sufficient period for maintaining under aerobic conditions for the sludge to perform the nitrification and, on the other hand, the nitrification requires an appropriate effluent residence time under anoxic conditions. For this purpose, in the small-load activated sludge processes used in a single aeration basin, the removal of nitrogen compounds results from a strict control of the alternation of the aerated and nonaerated sequences.

Any defect in the setting or the operation of the oxygen supply devices results in a malfunction of the wastewater purification stations, with repercussions on the quality of the effluent treated, the equilibrium of the purifying biomass and the characteristics of the sludge produced.

A lack of adaptation of the aeration sequences therefore has effects in the short term on the quality of the water obtained which may then contain nonoxidized nitrogen compounds if the periods of aeration are not sufficiently long, or nitrates if the periods of anoxia are too short. By contrast, when the periods of nonaeration are too long, the effluent to be treated encounters anaerobic conditions which must be absolutely avoided. Indeed, the phenomena of anaerobiosis in the treatment basin, linked to an underoxygenation of certain zones, cause in the long term the appearance of filamentous bacteria and these microorganisms induce a modification of the structure of the floc and a reduction in its sedimentation ability, which of course has an unfavourable repercussion on the quality and the cost of the treatment. Another consequence of an insufficient cumulative duration of aeration relates to the quality of the sludge and, in particular, determines its stability.

It can be understood why the regulation of aeration is one of the key points in such a water treatment process. Various methods of regulation have been used.

Thus, sensors measuring dissolved oxygen and the oxidation-reduction potential as well as various sensors serving to detect reference values have been used, a high threshold making it possible to stop the aeration and a low threshold to restart the aeration system, delaying means being used when the thresholds are not reached. These known systems are not completely satisfactory. Indeed, to optimize the nitrification and denitrification reactions, it is essential to supply oxygen when necessary and in a sufficient quantity, and not simply to supply oxygen as done by the systems described above.

In order to improve these systems, it has been necessary to continuously measure the oxidation-reduction potential EH of the medium and to analyse the go shape of the curve of the variation of this potential as a function of time. According to this known process, the derivative of this function EH=f(time) is calculated. If this derivative is negative, this corresponds to a reduction in the oxidation-reduction potential in anoxia phase and when the derivative is zero, a stabilizing phase is present. The system then calculates the period of aeration or of nonaeration to be allowed for, which is equal to the period of aeration or of nonaeration necessary to bring the oxidation-reduction potential to the value required to perform either the removal of carbon, or the nitrification, or the denitrification, plus the additional time necessary to perform the reaction. Such a system has disadvantages because the oxidation-reduction potential curve can take on an asymptotic shape (derivative tending towards 0) and, for certain oxidation-reduction potential values, it is absolutely necessary to avoid passing to a virtually stabilizing phase because the conditions are then inappropriate for the desired treatment (poor preservation of the biomass).

The present proprietor has been led to perfect the latter process. Thus, its patent FR-A-2,724,646 describes a system for regulating the aeration of a biological wastewater treatment using an activated sludge treatment applied to a combined removal of the carbon and of the nitrogen in a single basin plant provided with aeration means. Such a system recognizes, in real time, the level of treatment required in the basin and it controls the appropriate aeration sequence. Moreover, it provides a diagnostic assistance as regards the possible limits of the process. Thus, the aeration is better adapted to the conditions of the process and the reliability and the energy and economic management of the aeration are improved. It is thus possible to obtain complete removal of the carbon and of the nitrogen while maintaining a sufficient oxidation state of the sludge.

However, this system of regulation has limits. While it is perfectly suitable for activated sludge purification processes of the small load type, with a single and homogeneous aeration basin, it cannot be used on treatment sites whose configuration leads to several distinct aeration volumes or basins, placed in series, being differentiated. FIGS. 1a and 1b of the appended drawings very schematically represent two examples of such treatment plants. The cells of the aeration basins being physically separated, the oxidation state and the progress of the biological reactions in the basins are no longer uniform in the whole aeration volume. An alternation of the aerated and nonaerated sequences is still necessary in order to carry out the reactions. The known process, which was last to be described above, is not directly applicable to nonhomogeneous aeration basin configurations in series, given that the representativeness of the measurements of the oxidation-reduction potential cannot be ensured for the entire aeration volume of such basin configurations. In addition, a minimum residual carbon content is necessary in order to maintain the kinetics of denitrification at a high level. In case identical aeration sequences are maintained for all the aeration cells, the heterogeneity of the rate of progress of the reactions does not make it possible to successfully carry out and to optimize the biological reactions. It is therefore necessary to manage the aeration of the different basins in an independent and complementary manner. This is what constitutes the technical problem which is solved by the present invention.

BRIEF DESCRIPTION OF THE INVENTION

The subject of the present invention is therefore a process for regulating the aeration of a biological wastewater treatment plant, for the purpose of removing the carbon and nitrogen pollution, comprising several aeration basins arranged in series, this process being characterized by the following stages:

the oxidation-reduction potential EH is measured separately on each of the basins;

the said measurements are respectively transmitted to a data processing system for the purpose of analysing the variation of the oxidation-reduction potential and the establishment of the capacities (diagnoses) of the aeration-biology pair to bring about the reactions for degrading the carbon and nitrogen pollution, the starting, the continuation or the stopping of the aeration of the said basins is determined, from the said diagnoses, as a function of the desired degree of purification such that:
in the first basins, or upstream basins, the priority is given to the treatment of the carbon pollution with a specific parameterizing of the threshold values of the oxidation-reduction potential,
in the last basins, or downstream basins, the treatment of the carbon and nitrogen pollution is refined by a management of the aeration in accordance with the process described in FR-A-2, 724, 646.

BRIEF DESCRIPTION OF THE DRAWINGS

FIGS. 1a and 1b respectively represent serial and parallel connected basins, as known in the prior art;

FIG. 2a is a basic flowchart of a multiple basin configuration of series connected basins as employed in the present invention;

FIG. 2b is a basic flowchart of a U-shaped basin as employed in the present invention;

FIG. 3a is a schematic indication showing the relationships between the oxidation-reduction potentials and the objectives of biological reactions carried out in upstream cells;

FIG. 3b is a schematic indication showing the relationships between the oxidation-reduction potentials and the objectives of biological reactions carried out in downstream cells;

FIG. 4 is a representation of the oxidation-reduction potential (EH) as divided into a succession of zones.

DETAILED DESCRIPTION OF THE INVENTION

Figure 5:
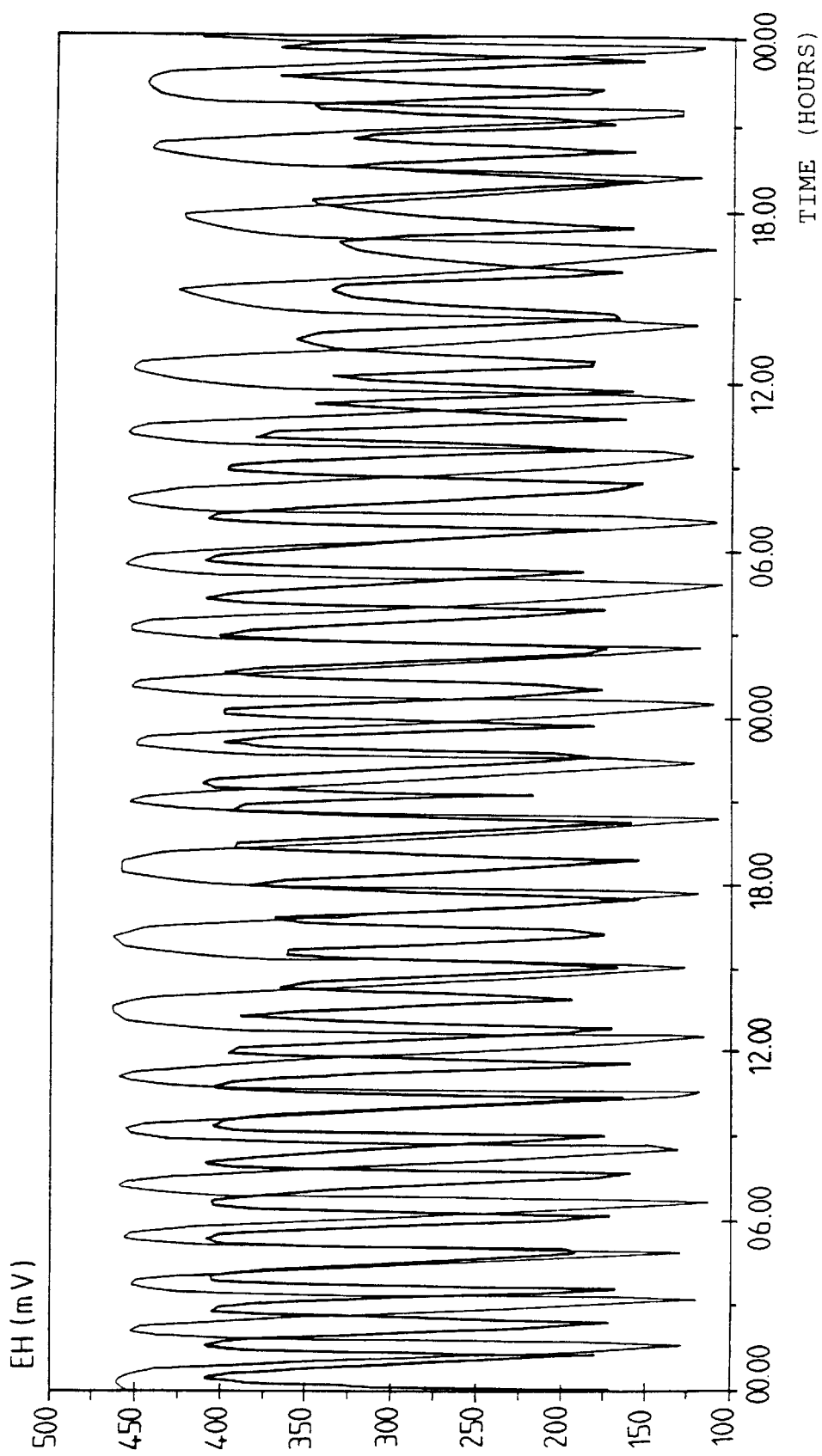
FIG. 5 is a plot that illustrates the effects of a modification of a pollution regime on an aeration sequence.

As can be understood, the technical problem solved by the present invention consists in bringing about an independent but complementary regulation in the different aeration cells of the plant. Oxidation-reduction potential detectors are therefore positioned on each distinct fraction of the aeration volume. FIGS. 2a and 2b of the appended drawings very schematically represent multiple basin configurations in series: separate basins (FIG. 2a) and U-shaped basin (FIG. 2b). In the case of the U-shaped basin, provision is made for two separate aeration control systems for bringing about regulation on each of the aeration cells which are delimited in this particular case. A separate regulation of the aeration is performed on the upstream and downstream cells. According to the invention, the progress of the nitrification reactions is deliberately limited on the upstream cells, by limiting the length of the aeration sequences, the priority being given to the removal of most of the carbon with the existence of a sufficient leakage of the residual carbon compounds towards the downstream cells in order to promote the denitrification therein. Thus, the downstream cells bring about complete removal of the nitrogen pollution and complete the removal of the remaining carbon. According to the invention, complementarity of the upstream and downstream treatments is provided, with a completion of the downstream treatment and a reduction in the load variations by the upstream cells.

FIGS. 3a and 3b illustrate, respectively, the relationships between the oxidation-reduction potentials and the objectives of the biological reactions carried out on the upstream and downstream cells, respectively.

According to the process of the invention, the upstream cells are managed by a suitable logic which gives priority to the removal of the carbon pollution with a specific parameterizing of the threshold values of the oxidation-reduction potential, whereas the downstream cells are managed in accordance with the method of regulation described in FR-A-2,724,646, which makes it possible to finish the treatment by a complete removal of the nitrogen components and of the carbon components remaining after the treatment carried out in the upstream cells. During the aeration phases, the oxidation-reduction potential provides the desired degree of oxidation of the sludge. Thus, on the same automatic logic bases, the regulations of the aeration cells are distinct.

As can be understood, the programming is not based on a variation between thresholds, as in traditional automatic devices, but on the analysis of the variation of the curve EH=f(time).

As in the abovementioned French patent, the regulation is based on the analysis of the variations of the oxidation-reduction potential EH, these variations being representative of the changes in state of the species present: which changes can occur depending on the load for the purification station, the quality of the effluent to be treated entering the station, the temperature and the like.

The data processing system makes it possible to analyse the variation of the oxidation-reduction potential by calculating the derivatives (variation of the measurement over an interval of time), as in the already cited French patent. This analysis makes it possible to define the following variations:

positive derivative=increase in the concentrations of oxidized forms;

negative derivative=increase in the concentrations of reduced forms;

zero derivative=stabilization phase.

When the derivative tends towards the immeasurably small, a study of threshold variation is carried out which makes it possible to know the direction of variation of the oxidation-reduction potential EH. The range of oxidation-reduction potentials is divided into a succession of zones defining a quality criterion. As can be seen in FIG. 4 of the appended drawings and as already specified in the above-mentioned French patent, the following are identified:

3 activity or "quality criterion" zones:
  criterion 1 zone: nitrification zone
  criterion 2 zone: zone for removing the carbon and for partial denitrification
  criterion 3 zone: denitrification zone;
2 danger zones:
  a warning zone, in which the potential EH should not be maintained because it corresponds, in aeration phase, to operating conditions for which the oxygen content is insufficient to ensure removal of the carbon, and, in nonaeration phase, to an excessively high residual oxygen content which is incompatible with the denitrification;
  a forbidden zone, in which the risks of severe anaerobiosis are considerable and risk bringing about a major malfunctioning of the station.

Following its analysis (rate of variation and "quality criterion" zone), the automatic device establishes a diagnosis of the capacity of the aeration/biology pair to bring about the reactions for degrading the nitrogen and carbon pollution.

After establishment of the diagnosis, the automatic device determines the optimum periods of operation or stoppage of the aeration systems depending on the desired degree of purification, the regulations of the aeration cells being distinct on the same automatic logic bases:

period of aeration necessary to reequilibrate the system in order to reestablish a satisfactory degree of oxidation of the sludge;
  period of aeration necessary for an oxygen supply which allows the best use of the reactions for degrading the carbon load in the upstream cells;
  period of aeration necessary to complete the supply of oxygen in order to optimize the reactions for degrading the carbon load and the nitrification in the downstream cells;
  period necessary for stopping aeration in order to complete the denitrification in the downstream cells.

Apart from the actual regulation on the upstream and downstream aeration cells, the automatic device can manage warnings or defects when a human intervention is necessary, which makes it possible to detect discrepancies in the information received and to make them known to the operators, thereby improving the reliability of the aeration process as a whole.

There are three main causes likely to trigger the warning functions of the regulation system according to the invention:

a) major process disorders, such as failure of aeration means, a permanent pollution overload or even a deterioration in the biomass. In this case, the sole mission of the regulation system is to report the incidents to the operators;

b) metrological problems and, in particular, problems of validation of the oxidation-reduction potential measurement signal: defects in probes for measuring potential or maintenance inadequacies then cause a swing in the management of aeration on a "time" programmer, so as to free the regulation of the said aeration with respect to the measurement of the oxidation-reduction potential;

c) secondary warnings may also be activated when minor incidents appear, for example a temporary pollution overload or hydraulic interactions between the aeration cells. While bringing about the regulation of aeration, the system according to the invention warns the operator of these incidents.

The curves of the variation of the oxidation-reduction potential as a function of time in the system for automatic regulation of the aeration of the upstream and downstream cells have been represented in FIG. 5 of the appended drawings. They are of the same type as those which are observed in the case of the regulation on a single aeration basin, according to the already cited French patent, but they have, nevertheless, some clearly distinct features resulting from the different functions assigned to the different cells.

On the downstream aeration cells (curve of variation of the potential EH as a fine line), the domain of the variations of the oxidation-reduction potential signal is similar to that observed on an aeration cell in accordance with the prior art process described in the above cited French patent.

On the upstream aeration cells (curve of variation of the potential EH as a thick line), the domain of variations of oxidation-reduction potential is deliberately reduced in order to limit the occurrence of the nitrification reactions: this results in an increase in the frequency of the aeration sequences. As a guide, the daily frequency of the aeration cycles is greater than 15 on the upstream cells bringing about, as a priority, the removal of the carbon pollution, whereas this frequency is of the order of 7 to 12 daily aeration cycles for the downstream cells, bringing about the treatment of the nitrogen pollution.

On the upstream cells, the envelope of the curve of variation of the oxidation-reduction potential is representative of the diurnal supply of polluting load. During the night, the amplitudes of the variations are reduced and the increases in the oxidation-reduction potential are slower. This reduction in amplitude is less marked on the signals obtained from the downstream aeration cells. It should also be underlined that the time intervals between the aeration cycles are longer during the diurnal phases.

As in the process of regulation which is the subject of the already cited French patent, the effects of a dilution or of a pollution overload are reduced by the adaptation of the aeration cycles. In particular, the invention allows a reduction in the variations of the polluting loads on upstream aeration cells. A dilution of the polluting load, resulting for example from a downpour, causes an increase in the frequency of the aeration cycles, both on the upstream and downstream aeration cells. By contrast, a massive pollution overload limits the increase in the values of the oxidation-reduction potential and the aeration cycles are then more prolonged and fewer in frequency; in the latter case, the principal modification of aeration occurs on the upstream cells which then treat a substantial part of the polluting load, reducing the disturbances and leaving the downstream cells to finish the treatment.

This FIG. 5 illustrates the effects of a modification of the pollution regime on the aeration sequence. In the example of application to which FIG. 5 refers, a typical urban effluent, to which a substantial fraction of agro-industrial effluent has been added, is treated during the working days. This FIG. 5 represents the aeration cycles over 48 hours, with respectively small and high loads (corresponding respectively to a Sunday and to a Monday). The variation in the oxidation-reduction cycles on the upstream cells is modified with a high reduction in the slopes of increase during the working day. A high load is then visible, on Monday, from 10 am to 9 pm, whereas it was limited from 1 pm to 6 pm in the case of Sunday. It is also observed that the lengths of the cycles have been increased linked to the carbon pollution load. On the downstream aeration cells, it is important to note the modification of the envelope of the variations in the oxidation-reduction potential between the two days. The variation in amplitude is high on Sunday, when the low supply of pollution is essentially treated on the upstream aeration cells. By contrast, when the treatment capacity of the upstream cells is exceeded, the downstream cells are subjected to higher loads than they should treat. This gives the downstream cells a complementary character when the upstream aeration volumes are limited. Thus, the aeration is again adjusted to the polluting load. The energy expenditure necessary for the aeration process consequently tends to be adapted to the influent polluting load.

The exemplary embodiment to which FIG. 5 refers is a unit of 40,000 pop.eq. (population equivalent), which will be designated below site A, having a U-shaped aeration basin configuration as illustrated by FIG. 2b, comprising two aeration cells of 2600 m³ each, the oxygenation being provided by conventional aeration turbines. The cumulative aeration per day, was about 5 h 30 min on the upstream cell and 4 h 30 min on the downstream cell, for a respective aeration power of 120 kW and 80 kW, and a daily average load of 1050 kg of BOD. Even in different configurations, the distribution of the aeration between upstream and downstream cells is generally situated in the 60% (upstream)/40% downstream ratio. These results confirm that most of the treatment, as regards the degradation of the carbon compounds, is carried out on the upstream cell.

There will now be given, by way of nonlimiting examples, results obtained using the process according to the invention, on different water treatment plants.

The experiment reported here was carried out on three water treatment plants all having a configuration of aeration basins in series. These plants, called hereinafter sites A, B, C, had a capacity of 40,000, 15,000 and 14,000 pop.eq., respectively. On each site, a comparison was made between the result of the treatment with automatic regulation according to the invention and the result without regulation. Table 1 below summarizes the comparative results thus obtained.

TABLE

|  | Site A (without regu-laton) | Site A (with regu-lation) | Site B (without regu-lation) | Site B (with regu-lation) | Site C (without regu-lation) | Site C (with regu-lation) |
| --- | --- | --- | --- | --- | --- | --- |
| Compliance with EU standards | Yes | Yes | No | Yes | Yes | Yes |
| C removal yield (%) | 98.0 | 98.8 | 97 | 98 | 98.9 | 99.0 |
| N removal yield (%) | 95.1 | 95.1 | 50 | 80 | 88.8 | 93.8 |
| Energy savings |  | 15% |  | 5% |  | 20% |

The results thus mentioned clearly show that the system of regulation according to the invention makes it possible to comply with the discharge standards laid down by the European Union.

As regards site B, it will be noted that without the regulation according to the invention, a discharge of a nonoxidized form of the nitrogen compounds is produced whereas by using the invention, the removal of the nitrogen passes from 50 to 80%. The nitrogen compounds are, in this case, completely oxidized.

As regards sites A and C, the carbon and nitrogen removal yields were maintained or improved, these yields corresponding to the maximum which can be obtained by the capacity of the plant, even before introducing the process according to the invention.

It will be noted, in addition, that the use of the process of regulation according to the present invention makes it possible to make substantial energy savings.

The result of reading the preceding description is that the process which is the subject of the present invention provides particularly satisfactory results. As previously explained, the upstream aeration cells bring about a treatment of the major part of the polluting load, with a priority given to the removal of the carbon and the downstream cells complete the treatment by carrying out, moreover, the removal of the nitrogen. The invention makes it possible to obtain an excellent quality of the treated water accompanied by a high reliability especially as regards the management and the optimization of the aeration process. Furthermore, the invention makes it possible to obtain an optimization of the energy consumption which results in substantial exploitation savings.

It of course remains the case that the present invention is not limited to the exemplary embodiments described and/or represented but that it covers all the variants which come within the scope of the appended claims.

What is claimed is:

1. Process for regulating aeration of a biological wastewater treatment plant, for a purpose of removing carbon and nitrogen pollution, having aeration basins arranged in series, this process comprising the following stages:
   an oxidation-reduction potential EH is measured separately on each of the basins;
   the measurements are respectively transmitted to a data processing system for a purpose of analyzing a variation of the oxidation-reduction potential and diagnosis of capacities of an aeration-biology pair to bring about reactions degrading the carbon and nitrogen pollution, and
   starting, continuing, or stopping aeration of the basins is determined, from the diagnosis, as a function of a desired degree of purification such that:
      in first basins, or upstream basins, priority is given to treatment of the carbon pollution with a specific parameterizing of threshold values of the oxidation-reduction potential, and
      in last basins, or downstream basins, treatment of the carbon and nitrogen pollution is refined by a management of the aeration which consists in establishing a curve of the variation of the oxidation-reduction potential, measured on the downstream basins, as a function of time and in calculating a derivative and, when this derivative tends toward zero, the derivative and a value of the oxidation-reduction potential are correlated in order to determine the starting, the continuation or the stopping of the aeration of the downstream basins.

2. Process according to claim 1, wherein, after establishment of the diagnosis, optimum periods of operation or stoppage of aeration systems of different basins are determined as a function of desired degree of purification, the periods further comprising:

period of aeration necessary to reequilibrate the systems in order to reestablish a satisfactory degree of oxidation of sludge;

period of aeration necessary for an oxygen supply which allows best use of reactions for degrading the carbon load in the upstream basin(s);

period of aeration necessary to complete a supply of oxygen in order to optimize the reactions for degrading the carbon load and nitrification in the downstream basin(s);

period necessary for stopping aeration in order to complete denitrification in the downstream basin(s).

3. Process according to claim 1, further wherein warning or defect signals are generated which relate in particular to deficiencies in an aeration system, a permanent or temporary polluting overload, a deterioration of a biomass, defects in an operation of probes for measuring oxidation-reduction potential, hydraulic interactions between the different basins.

4. Process according to claim 2, wherein warning or defect signals are generated which relate in particular to deficiencies in aeration systems, a permanent or temporary polluting overload, a deterioration of a biomass, defects in an operation of probes for measuring the oxidation-reduction potential, hydraulic interactions between the different basins.

* * * * *